US009096465B2

(12) United States Patent
Tuttle et al.

(10) Patent No.: US 9,096,465 B2
(45) Date of Patent: Aug. 4, 2015

(54) SUSTAINABLE COMPOSITE BUILDING MATERIALS AND RELATED METHODS OF MANUFACTURE

(71) Applicant: Haworth, Inc., Holland, MI (US)

(72) Inventors: Robert L. Tuttle, Fennville, MI (US); Ronald H. Brown, Holland, MI (US); Anthony McConnell, Zeeland, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 14/210,704

(22) Filed: Mar. 14, 2014

(65) Prior Publication Data
US 2014/0260028 A1 Sep. 18, 2014

Related U.S. Application Data

(60) Provisional application No. 61/789,837, filed on Mar. 15, 2013.

(51) Int. Cl.
C04B 9/00 (2006.01)
C04B 9/04 (2006.01)
E04C 2/16 (2006.01)
B29C 43/22 (2006.01)
B29C 43/28 (2006.01)

(52) U.S. Cl.
CPC ... *C04B 9/04* (2013.01); *E04C 2/16* (2013.01); *B29C 43/228* (2013.01); *B29C 43/28* (2013.01)

(58) Field of Classification Search
CPC ........ C04B 9/04; B29C 43/228; B29C 43/28; B29C 43/305; B29C 43/48; B29C 70/46; B29C 70/462
See application file for complete search history.

(56) References Cited

U.S. PATENT DOCUMENTS

| 1,518,243 | A | * | 12/1924 | Birdsey | 156/348 |
| 2,239,860 | A | * | 4/1941 | Roos | 156/40 |
| 3,042,573 | A | | 7/1962 | Roberts | |
| 3,766,129 | A | | 10/1973 | Pesez | |
| 5,037,690 | A | | 8/1991 | van der Kooy | |
| 5,049,197 | A | | 9/1991 | Brown | |
| 6,773,794 | B2 | | 8/2004 | Lindner | |

(Continued)

OTHER PUBLICATIONS http://greenhomebuilding.com/QandA/manufactured/magnesiumoxide.htm, version available Jan. 6, 2012, 8 pages.*

*Primary Examiner* — Matthew Daniels
(74) *Attorney, Agent, or Firm* — Warner Norcross & Judd LLP

(57) ABSTRACT

Sustainable composite materials for interior spaces and related methods of manufacture are provided. In one aspect of the invention, the sustainable composite materials include a load-bearing stud. The load-bearing stud includes a plurality of woven burlap layers impregnated with a magnesium oxide resin. The load-bearing stud is formed by creasing a woven burlap sheet to form multiple foldable panels, wetting the foldable panels with a curable resin, layering the foldable panels to achieve a multi-layered prepreg, pressing the multi-layered prepreg to distribute the resin therethrough, compacting the multi-layered prepreg within a mold cavity having the exterior shape of the load-bearing stud, and curing the multi-layered prepreg, wherein the resin includes a mixture of mono-potassium phosphate and magnesium oxide. The load-bearing stud provides a lightweight, dimensionally stable, and environmentally-friendly composite structure to replace lumber studs and metal studs in building constructions.

8 Claims, 10 Drawing Sheets

(56) References Cited

U.S. PATENT DOCUMENTS

| | | |
|---|---|---|
| 7,255,907 B2 | 8/2007 | Feigin et al. |
| 7,429,290 B2 * | 9/2008 | Lally .................... 106/18.14 |
| 2004/0173928 A1 | 9/2004 | Suh |
| 2009/0130377 A1 | 5/2009 | Samanta et al. |
| 2009/0133361 A1 | 5/2009 | Vera |
| 2009/0233104 A1 | 9/2009 | Fan et al. |
| 2010/0081008 A1 | 4/2010 | Trout |
| 2011/0229698 A1 | 9/2011 | Rasmussen et al. |
| 2011/0271616 A1 | 11/2011 | Rasmussen et al. |
| 2012/0070609 A1 | 3/2012 | Poppe et al. |
| 2012/0128950 A1 | 5/2012 | Kang et al. |
| 2012/0234207 A1 * | 9/2012 | Orava et al. ................ 106/691 |

* cited by examiner

DECK-TO-DECK

FLOOR-TO-DECK

FREESTANDING SPACE DIVIDER

SUSTAINABLE COMPOSITE BUILDING MATERIALS AND RELATED METHODS OF MANUFACTURE

FIELD OF THE INVENTION

The present invention relates to composite building materials and, more particularly, impregnated burlap building materials and related methods of manufacture.

BACKGROUND OF THE INVENTION

Composite materials generally include a combination of two or more constituent materials to achieve a finished product having superior mechanical or chemical qualities. Composite materials are increasingly common across a range of technology areas. For example, composite materials have been used in the manufacture of sporting equipment, automobile bodies, and aerospace structures.

More recently, composite materials have been used in the manufacture of exterior building materials, including both structural and non-structural materials. For example, composite decking includes a combination of wood and plastic fibers, and is generally more resistant to animals, insects and warping than traditional wood decking.

Despite their advantages, composite materials can in some instances be harmful to the environment. For example, composite building materials can include component ingredients that are not recyclable or that do not originate from sustainable sources. Also by example, composite building materials can take many decades to decompose, and can release chemicals that are harmful to local ecosystems.

The use of naturally occurring biomaterials in the manufacture of composite building materials can overcome at least some of the shortcomings noted above. Accordingly, there remains a need for improved composite building materials including component biomaterials. In particular, there remains a need for improved interior composite building materials that are biodegradable, that are generally free of harmful chemicals, and that meet or exceed the structural qualities of existing materials.

SUMMARY OF THE INVENTION

Sustainable composite materials for interior spaces and related methods of manufacture are provided. In a first aspect of the invention, the sustainable composite materials include a load-bearing stud. The load-bearing stud includes a plurality of woven burlap layers impregnated with a magnesium oxide resin to form a hardened structure when cured. The load-bearing stud includes a base and left and right legs to form a wide variety of cross-sections, including U-shaped cross-sections and C-shaped cross-sections. The load-bearing stud additionally provides a lightweight, dimensionally stable, and environmentally-friendly composite structure to replace conventional lumber studs and conventional metal studs in building constructions.

In another aspect of the invention, a method for forming a load-bearing stud is provided. The method includes creasing a woven burlap sheet to form a plurality of foldable panels, wetting the panels with a curable resin, folding the foldable panels to achieve a multi-layered prepreg, pressing the multi-layered prepreg to distribute the resin therethrough, compacting the multi-layered prepreg within a mold cavity having the desired exterior shape of the load-bearing stud, and curing the folded prepreg, wherein the curable resin includes a mixture of mono-potassium phosphate and magnesium oxide.

In still another aspect of the invention, a modular wall panel assembly is provided. The modular wall panel assembly includes a first magnesium oxide wall panel, a second magnesium oxide wall panel, and a plurality of load-bearing studs interposed between the first and second magnesium oxide wall panels, wherein the plurality of load-bearing studs include a plurality of woven burlap layers impregnated with a magnesium oxide resin. The load-bearing studs include an elongate bottom stud, an elongate top stud, and a plurality of vertical studs spanning the height of the first and second wall panels, wherein the plurality of load-bearing studs are bonded to the magnesium oxide wall panels with an adhesive. The modular wall panel assembly can include digital printing thereon, and can further optionally include embedded wires or cables. The modular wall panels can be sized for use as a floor-to-ceiling panel or as a load-bearing deck to deck panel in commercial and residential constructions.

These and other advantages and features of the invention will be more fully understood and appreciated by reference to the description of the current embodiments and the drawings.

DESCRIPTION OF THE CURRENT EMBODIMENTS

Figure 1:
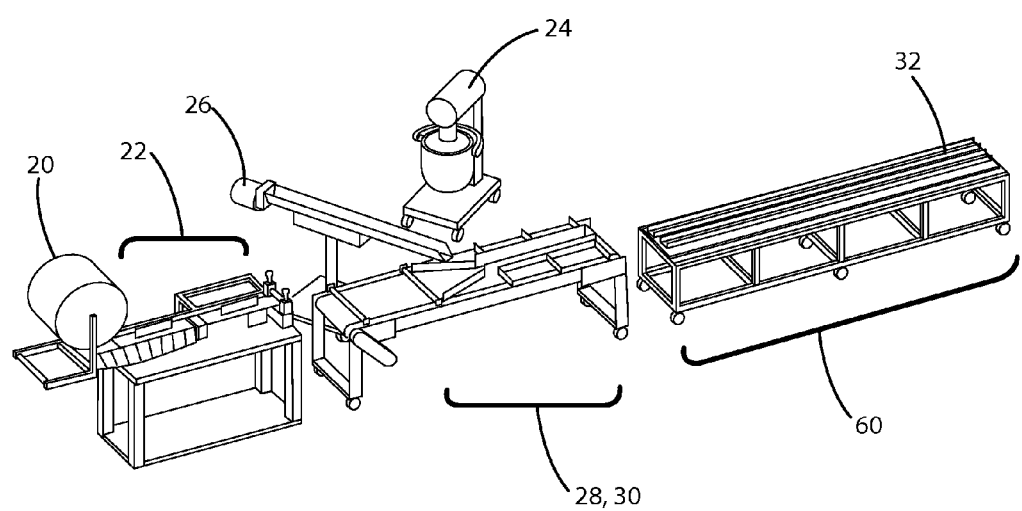
FIG. 1 is an illustration of a C-channel manufacturing operation in accordance with one embodiment of the present invention.

The current embodiments relate to sustainable composite materials for interior spaces, and in particular, load-bearing studs and pre-fabricated wall panels, as well as related methods of manufacture. In these embodiments, the sustainable composite materials include, as one component, cellulose-based plant fibers, and in particular burlap, also referred to as jute and hessian. The cellulose-based plant fibers can be unwoven or woven, for example woven burlap sheets originating in spooled rolls. The sustainable composite materials also include, as another component, an aqueous resin to form a hardened matrix. The aqueous resin can include magnesium oxide and mono-potassium phosphate, optionally in a ratio between 1:1 and 1:3 by weight. The aqueous resin can be substantially free of chemicals that may be harmful to the environment, including for example silica and boric acid.

Referring now to FIGS. 1-4, a method for manufacturing a sustainable composite load-bearing member will now be described. The method initially includes feeding a woven burlap mat 20 through a creasing station 22 to crease the woven burlap mat 20 into a plurality of foldable panels. The creases extend longitudinally along the length of the burlap mat, such that the foldable panels can fold over each other to form a multi-layered structure. For example, two creases separate the burlap mat into thirds, allowing the outer two segments to fold over a single central segment into a three-ply mat. Also by example, three creases separate the burlap mat into fourths, allowing the outer two segments to each fold over one of two central segments, which then fold over each other to form a four-ply mat.

The method further includes wetting the woven burlap mat 20 with a curable resin. The curable resin includes a homogenous dry mixture and an aqueous solution, optionally being mixed immediately before the wetting application to prevent premature setting. The homogenous dry mixture includes magnesium oxide and mono-potassium phosphate in the present embodiment. The ratio of magnesium oxide to mono-potassium phosphate is optionally between about 1:1 and about 1:3 by weight, while in other embodiments the ratio can vary outside this range. The magnesium oxide can be present in the dry mixture between about 5 and 50 percent by weight, while mono-potassium phosphate can be present in the dry mixture between about 15 to 70 percent by weight. Other ingredients can also be added to the dry mixture as desired. Exemplary dry mixtures are also set forth in U.S. Pat. No. 7,429,290 to Lally, the disclosure of which is hereby incorporated by reference in its entirety. The dry mixture is then thoroughly mixed with the aqueous solution, for example water. Suitable mixing times can vary, but can include between several seconds to several minutes, optionally using a commercial mixer 24. The water is optionally applied at less than room temperature and between about 15 and 55 percent by weight of the dry mixture to slow setting of the resin.

Once the burlap mat is wetted with a curable resin, optionally using a screw auger 26, additional plies of burlap can be wetted and added to the original burlap mat 20. For example, where the burlap mat includes two crease lines, one or more additional plies can be layered over the single central segment. The burlap mat then passes through a folding station 28 to achieve a multi-layered prepreg. As the term is used herein, prepreg means a fiber structure that has been wetted or impregnated with a resin prior to curing. The multi-layered prepreg then passes through a pressing station 30 to evenly distribute the resin throughout the voids in the burlap mat. For example, the pressing station can include multiple rollers. As the multi-layered prepreg exits the folding station, the rollers extend transversely to the direction of travel to intercept and flatten the multi-layered prepreg across its width.

Figure 3:
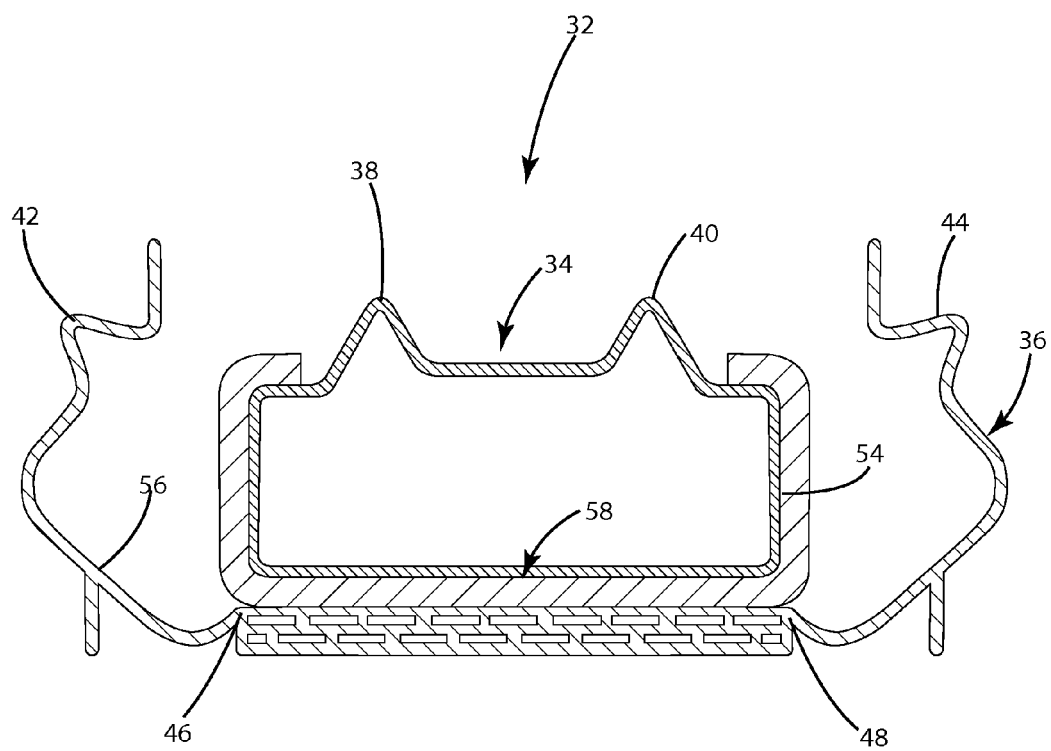
FIG. 3 is a cross-sectional view of an extruded mold for forming a C-channel in accordance with one embodiment of the present invention.

The method further includes compacting the multi-layered prepreg within an extruded mold having an internal mold cavity, wherein the internal mold cavity includes the desired exterior shape of the load-bearing member. A cross-sectional view of the extruded mold 32 is shown in FIG. 3. The extruded mold 32 includes an interior (or male) mold portion 34 and an exterior (or female) mold portion 36. The interior mold portion 34 includes first and second fingers 38, 40 to mate with corresponding first and second grooves 42, 44 of the exterior mold portion 36. The exterior mold portion 36 additionally includes first and second hinge lines 46, 48 to permit a left leg 50 to close with respect to the interior mold portion 34 and a right leg 52 to close with respect to the interior mold portion 34. The interior and exterior mold portions 34, 36 including opposing surfaces 54, 56 that are urged into registration against the multi-layered prepreg 58, optionally under a source of external pressure. Once closed, the extruded mold 32 provides the desired three-dimensional shape to the multi-layered prepreg 58 while allowing the resin to cure, optionally for a period of one hour or more.

Figure 2:
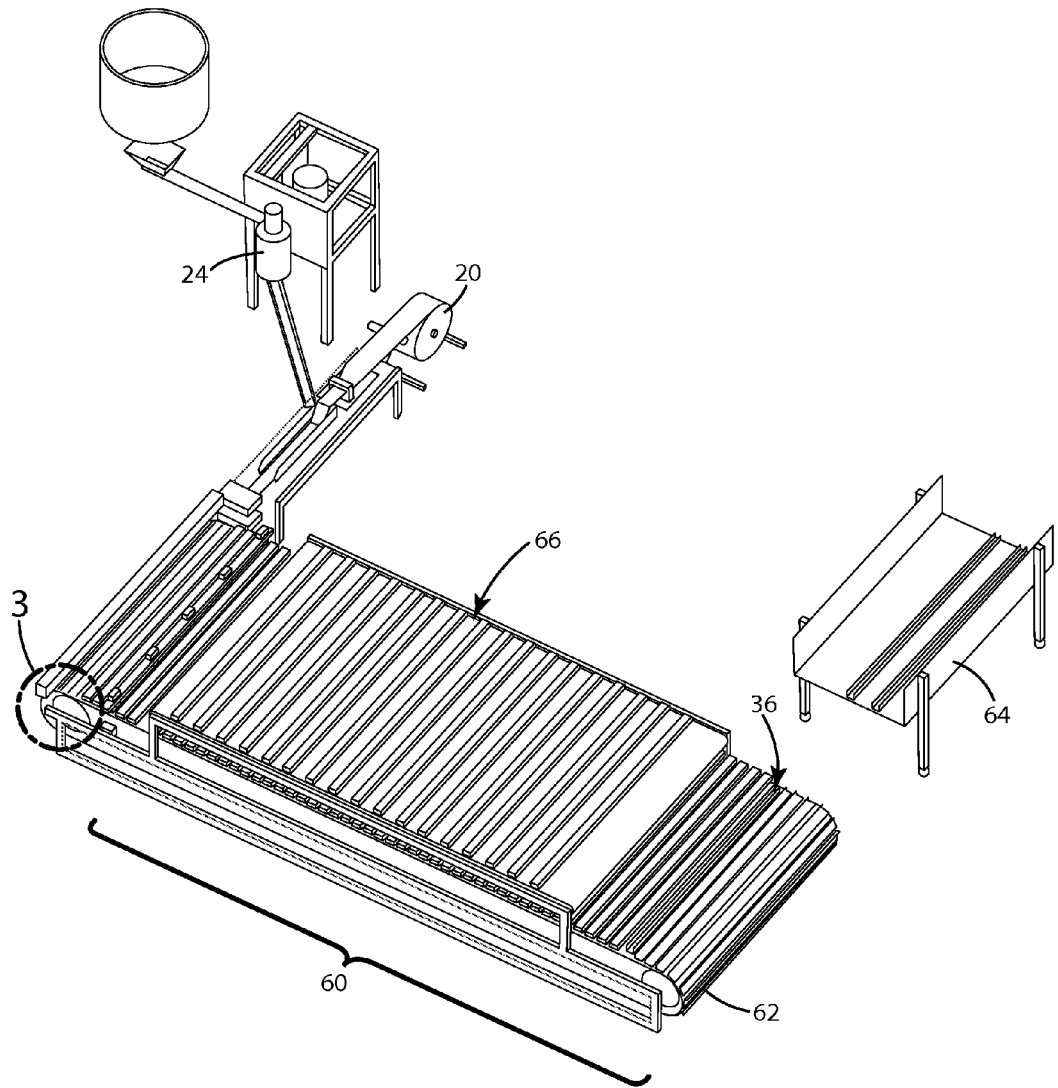
FIG. 2 is an illustration of a C-channel manufacturing operation in accordance with another embodiment of the present invention.

One example of a curing station is depicted in FIG. 2. The curing station 60 includes a continuous belt 62 having a plurality of exterior mold portions 36 affixed thereto. For example, the continuous belt 62 can include a given number of exterior mold portions 36 extending transverse to the direction of travel. The wetted multi-layer prepreg is placed into an exterior mold portion 36, the interior mold portion 34 is inserted, and the exterior mold portion 36 is closed, urging the opposing surfaces 54, 56 into registration against the wetted multi-layered prepreg. When the mold 32 reaches the end of the curing station 60, the mold 32 is opened, and a partially-cured load-bearing member 58 is removed from the mold 32. The partially-cured load-bearing member 58 is allowed to cure at a final curing cart 64, also depicted in FIG. 2, while internal mold portions 34 are returned to the beginning of the conveyor 62 along an upper return conveyor 66. Though not shown, either or both of the current station 60 and the curing cart 64 can include an oven or other heat source to advance the curing of the multi-layered prepreg. In the present embodiment, however, curing is performed substantially at room temperature. Once cured, a finishing process is applied to the load-bearing member. The finishing process can include structural aspects such as deburring, sanding or grinding any imperfections, and can include aesthetic aspects such as painting or polishing.

Figure 4:
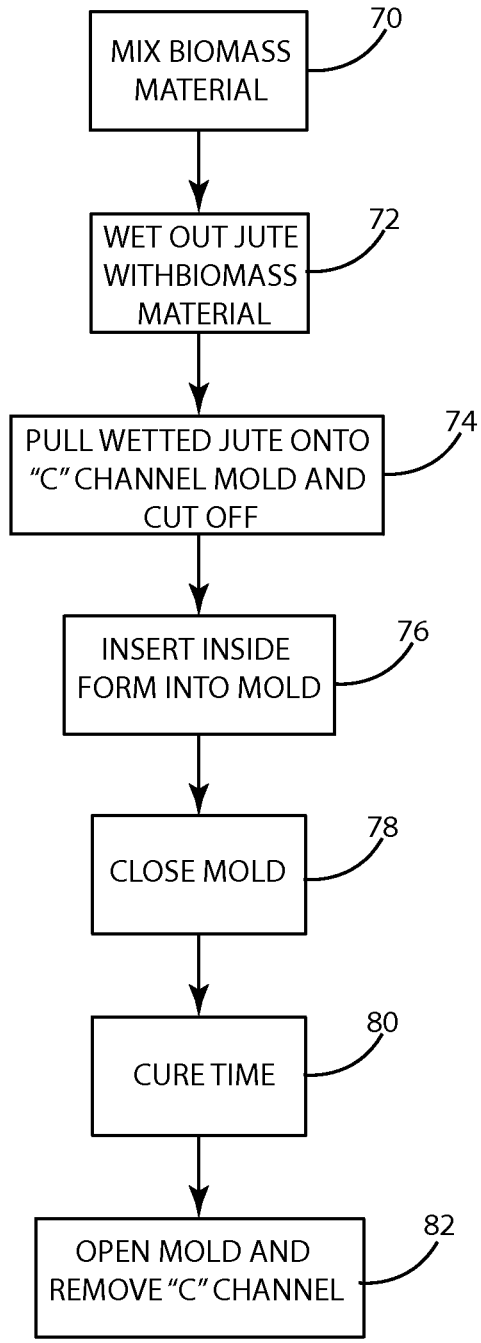
FIG. 4 is a flow chart illustrating a method of manufacturing a sustainable load-bearing member in accordance with one embodiment of the present invention.

To reiterate, and with reference to the flow chart of FIG. 4, the present manufacturing method generally includes mixing a resin at step 70, wetting a burlap mat with the resin at step 72, optionally preceded by folding the burlap mat into a desired number of layers, transferring the wetted burlap mat into a mold at step 74, closing the mold at step 76, curing the wetted burlap mat at step 80, and opening and removing a hardened stud from the mold for further processing at step 82. The present manufacturing method can optionally include a run rate of at least 40 feet per minute using two-pieced, extruded replaceable molds 32 shown in FIG. 3. In modifications of the manufacturing method however, the wetted burlap mat can be roll formed into the desired shaped, rather than being inserted into a two-pieced extruded mold.

Figure 5:
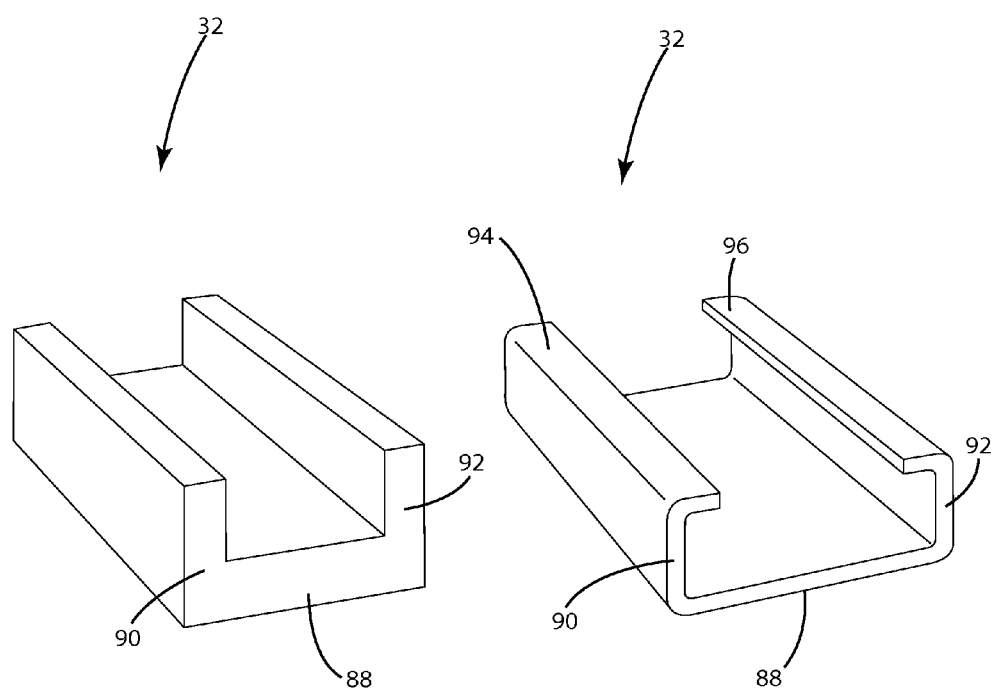
FIG. 5 are schematic illustrations of a U-channel and a C-channel.

The resulting load-bearing member can assume a wide variety of lengths and cross-sectional shapes. The load-bearing member can include standard lumber dimensions, including 2"×4" and 2"×6" for example. Two exemplary cross-sectional shapes are depicted in FIG. 5, in particular a U-channel 84 and a C-channel 86. Both of the U-channel 84 and the C-channel 86 include a base segment 88 and left and right leg segments 90, 92. The C-channel 86 additionally includes a left lip 94 and a right lip 96 to provide added torsional strength. Other cross-sectional shapes may be used in other embodiments. For example, the load-bearing member can include an I-beam cross-section. The resulting load-bearing member can be both lightweight and strong, drawing its compressive and tensile strength from the fibrous resin matrix.

Figure 6:
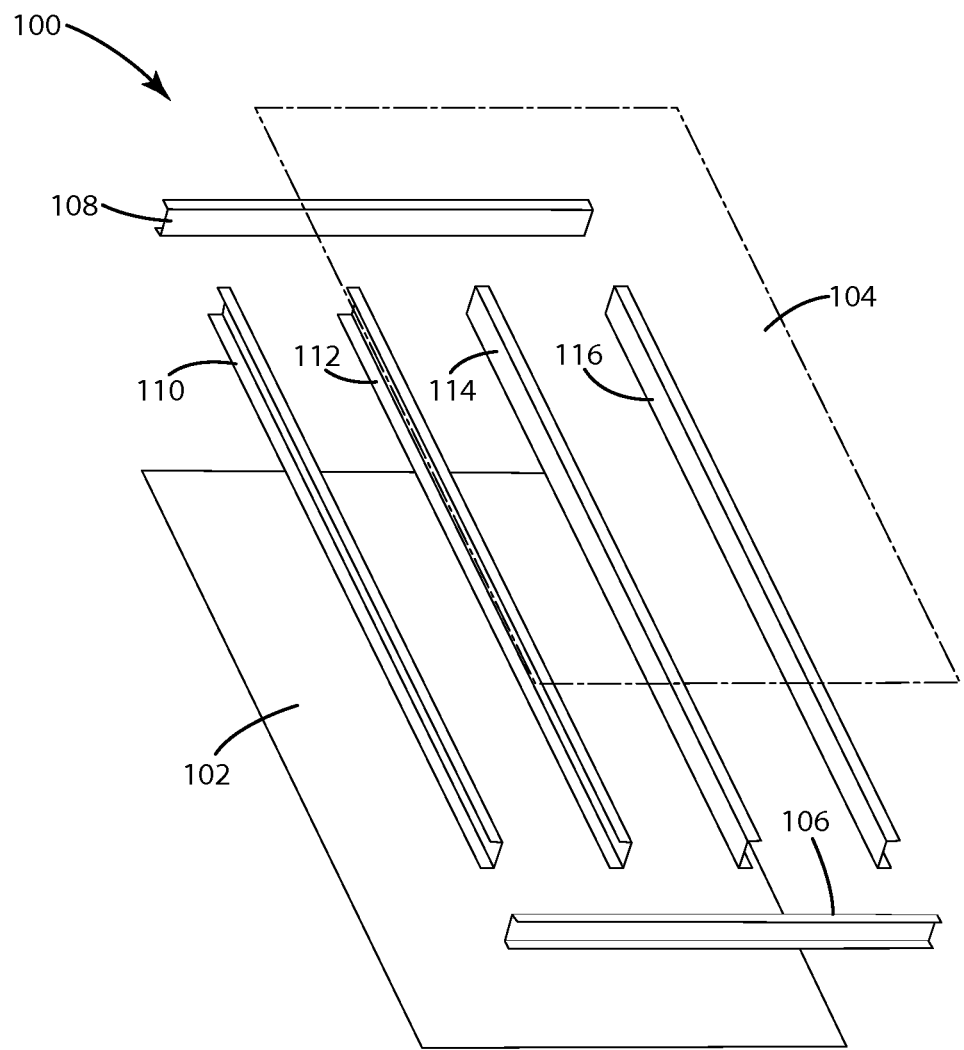
FIG. 6 is a schematic illustration of a pre-fabricated wall panel assembly in accordance with an embodiment of the present invention.

The load-bearing member can additionally be used to form a pre-fabricated wall panel assembly, particularly for interior use as a floor-to-ceiling wall panel, a deck-to-deck wall panel, or as a free-standing wall panel. Referring now to FIG. 6, a pre-fabricated wall panel assembly is illustrated and generally designated 100. The pre-fabricated wall panel assembly 100 includes first and second wallboards 102, 104 and a plurality of load-bearing studs 106, 108, 110, 112, 114, 116 interposed therebetween. The wallboards 102, 104 include a molded composition of magnesium oxide and magnesium chloride, being generally fire resistant, water resistant, and substantially free of silicate-based products. The wallboards 102, 104 are generally parallel to each other, being spaced apart by the width of the load-bearing studs, in this instance 4 inches. The load-bearing studs include a laterally elongate bottom stud 106, a laterally elongate top stud 108, and a plurality of vertical studs 110, 112, 114, 116 spanning the height of the first and second wallboards 102, 104. The load-bearing studs are U-channels in the illustrated embodiment, but can include C-channels or other cross-sections in other embodiments.

The load-bearing studs are bonded to the first and second wall panels using an adhesive in the present embodiment, optionally a hotmelt from Henkel AG & Co. In other embodiments conventional metal fasteners are used to secure the load-bearing studs to the first and second wall panels. The wall panel assembly can include embedded wires or cables, and can include a painted exterior. For example, the wall panel assembly can include a digital printing thereon, optionally a latex printing.

Figure 7:
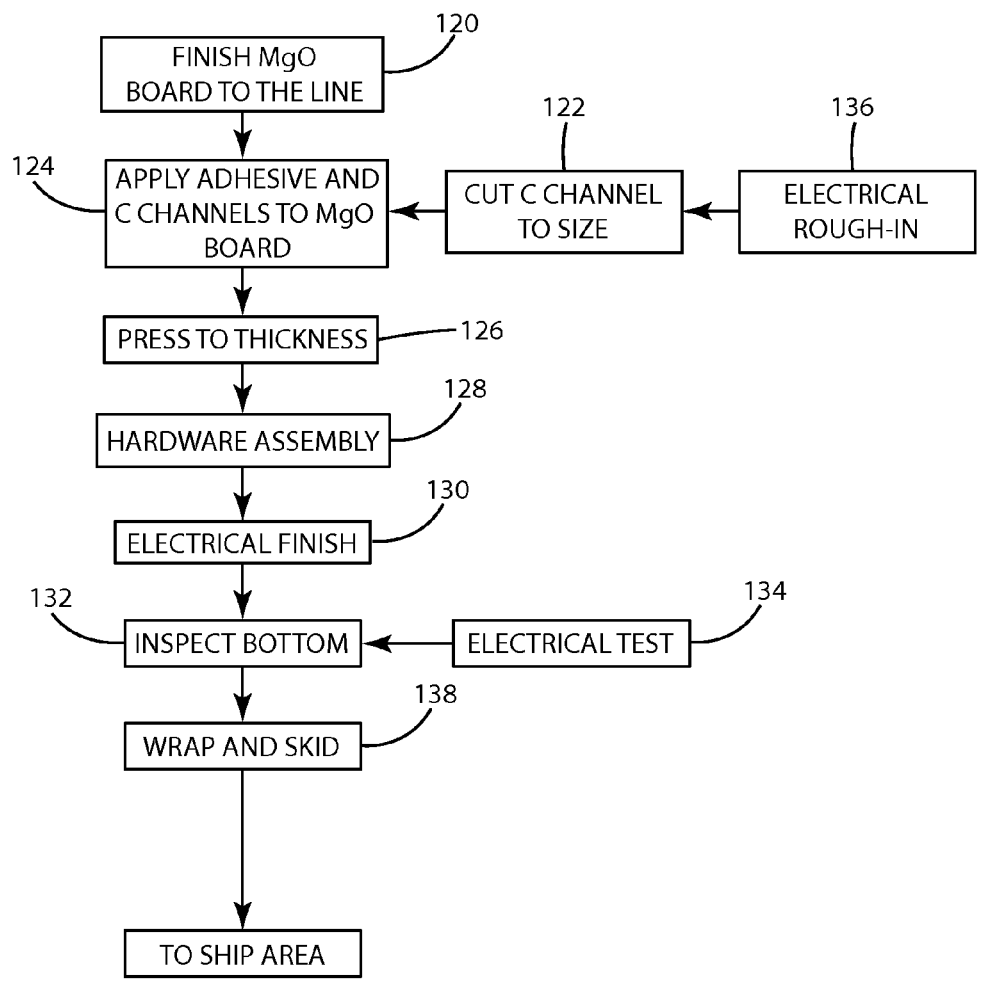
FIG. 7 is a flow chart illustrating a method of manufacturing a sustainable wall panel assembly in accordance with an embodiment of the present invention.

Referring now to FIG. 7, a method for manufacturing the wall panel assembly will now be described. The method generally includes providing magnesium oxide wallboard at step 120 and cutting the studs to length at step 122. At step 124, the studs are bonded to the wallboard using a non-toxic adhesive, for example a hotmelt. A holding press then presses the wall panel assembly to the desired thickness at step 126. Steps 128 and 130 include a hardware assembly and an electrical finish, respectively. At step 132 the wall panel assembly is inspected, and at step 134 the wall panel assembly electrical components are tested. Once passing inspection, the wall panel assembly is wrapped and stacked for shipment at step 138.

Figure 8:
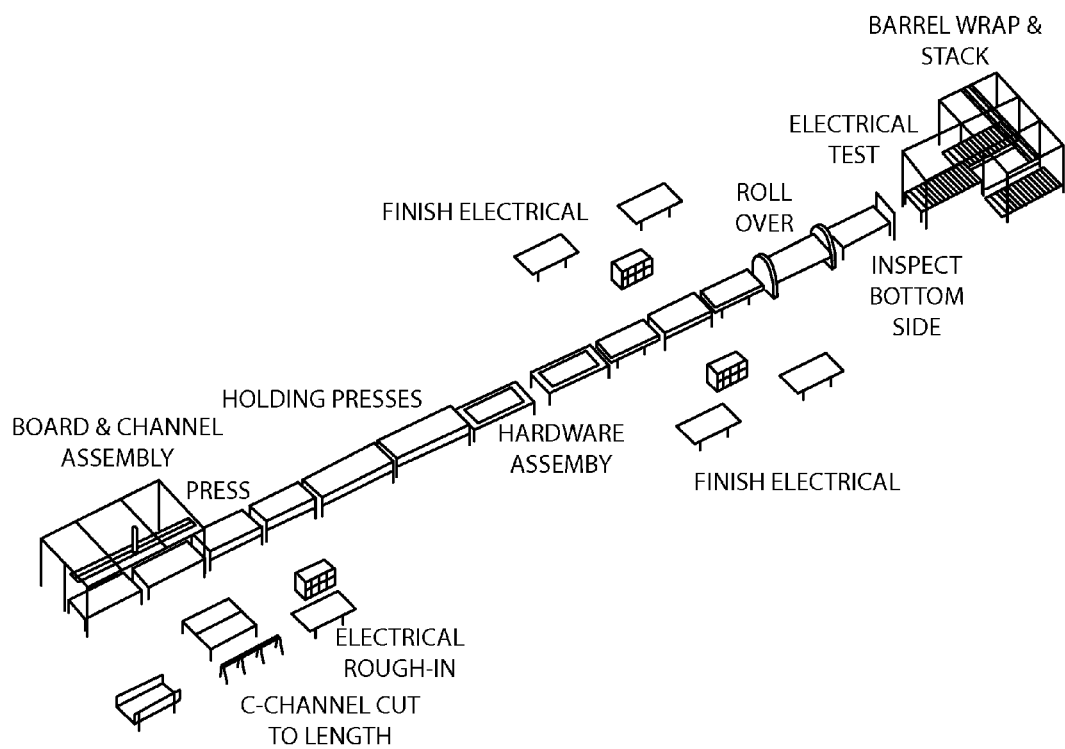
FIG. 8 is an illustration of a wall panel assembly manufacturing operation in accordance with an embodiment of the present invention.
Figure 9:
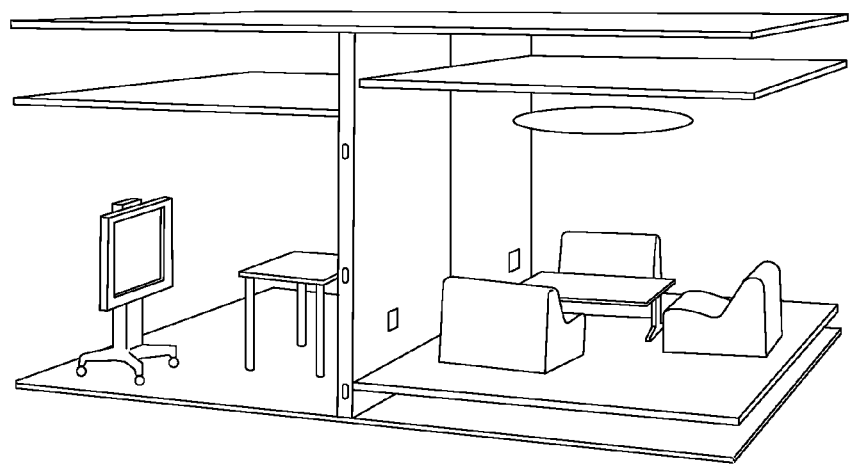
FIG. 9 is an illustration of a pre-fabricated deck-to-deck wall panel.
Figure 10:
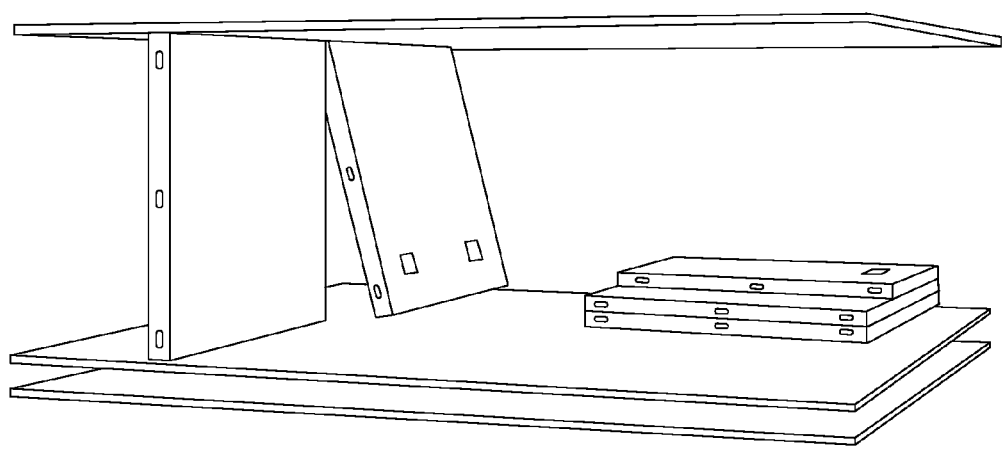
FIG. 10 is an illustration of a pre-fabricated floor-to-ceiling wall panel.
Figure 11:
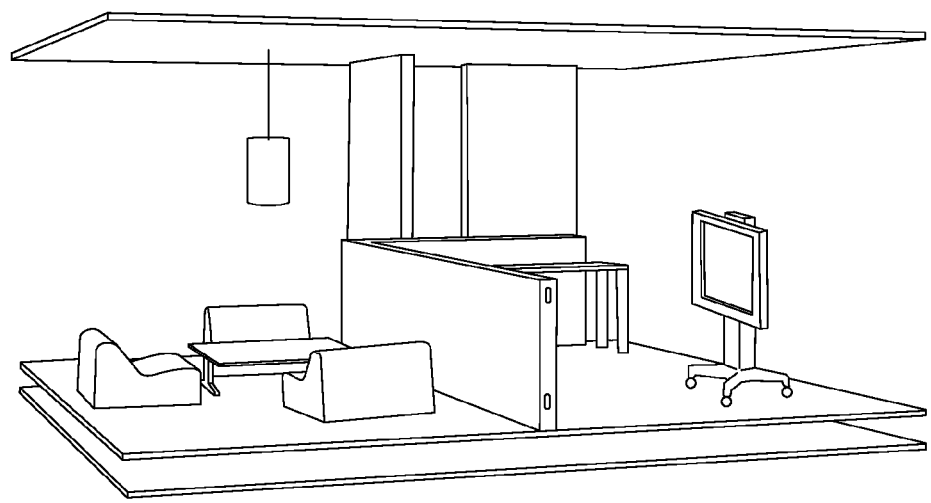
FIG. 11 is an illustration of a pre-fabricated freestanding space divider.

The above process is graphically illustrated in FIG. 8. As shown, additional hardware, trim and electrical components can be added in a line manufacturing process that is both scalable and partially automated. The completed wall panel assemblies can additionally be manufactured to be both fire rated and acoustically rated. The completed wall panel assemblies can be used across a wide range of applications. For example, pre-fabricated wall panel assemblies can be used in the manufacture and renovation of low-rise offices, high-rise offices, healthcare facilities, educational facilities, hotels, manufacturing facilities, and warehousing facilities. In these and other facilities, the pre-fabricated wall panel assemblies can be used as deck-to-deck, floor-to-ceiling, and free-standing space dividers as generally depicted in FIGS. 9-11.

The above embodiments of the present invention therefore provide pre-fabricated wall panel assemblies that are largely renewable and biodegradable. The wall panel assemblies leverage the benefits of cellulose-based biomaterials, and in particular burlap, and are in many instances visually superior to existing products. As one of ordinary skill in the art will appreciate, the above methods for manufacturing burlap fiber-reinforced studs and wall panel assemblies may be tailored to have specific properties and may be subject to further processing not expressly set forth above.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A method for forming a load-bearing member, comprising:
   creasing a woven burlap sheet to form a plurality of foldable panels;
   wetting the foldable panels with a magnesium oxide resin;
   folding the foldable panels to achieve a multi-layered prepreg;
   pressing the multi-layered prepreg to distribute the magnesium oxide resin;
   compacting the multi-layered prepreg within a mold cavity having the exterior shape of the load-bearing member, wherein the load-bearing member includes a generally U-shaped cross-section; and
   curing the multi-layered prepreg.

2. The method according to claim 1 wherein the curing step is performed at room temperature.

3. The method according to claim 1 wherein the resin includes an agitated mixture of magnesium oxide, mono-potassium phosphate and water.

4. The method according to claim 3 wherein the resin includes a ratio of mono-potassium phosphate and magnesium oxide between about 3:1 and 1:1 by weight.

5. A The method according to claim 1 for forming a load-bearing member, comprising:
   creasing a woven burlap sheet to form a plurality of foldable panels;
   wetting the foldable panels with a magnesium oxide resin;
   folding the foldable panels to achieve a multi-layered prepreg;
   pressing the multi-layered prepreg to distribute the magnesium oxide resin;
   compacting the multi-layered prepreg within a mold cavity having the exterior shape of the load-bearing member, wherein the load-bearing member includes a generally C-shaped cross-section, and
   curing the multi-layered prepreg.

6. The method according to claim 5 wherein the curing step is performed at room temperature.

7. The method according to claim 5 wherein the resin includes an agitated mixture of magnesium oxide, mono-potassium phosphate and water.

8. The method according to claim 7 wherein the resin includes a ratio of mono-potassium phosphate and magnesium oxide between about 3:1 and 1:1 by weight.

* * * * *

UNITED STATES PATENT AND TRADEMARK OFFICE
CERTIFICATE OF CORRECTION

| | | |
|---|---|---|
| PATENT NO. | : 9,096,465 B2 | Page 1 of 1 |
| APPLICATION NO. | : 14/210704 | |
| DATED | : August 4, 2015 | |
| INVENTOR(S) | : Robert L. Tuttle et al. | |

It is certified that error appears in the above-identified patent and that said Letters Patent is hereby corrected as shown below:

In the claims

Claim 5, column 6, lines 40-41 read:

"5. A The method according to claim 1 for forming a load-bearing member, comprising:"

should be

--5. A method for forming a load-bearing member, comprising:--

Signed and Sealed this
Fifteenth Day of December, 2015

Michelle K. Lee
*Director of the United States Patent and Trademark Office*